Figure 1:
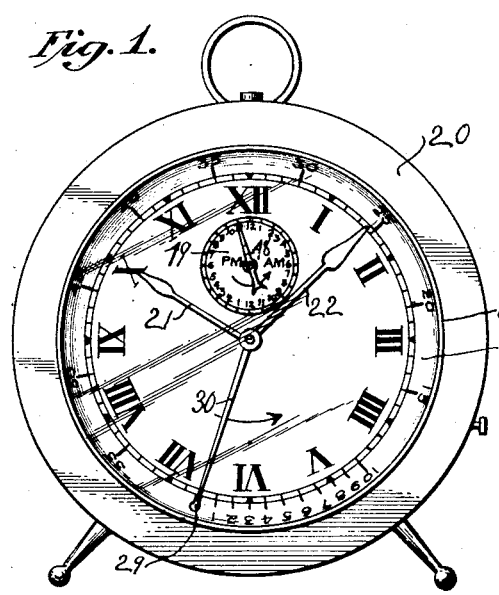

E. E. GAGE.
ALARM MECHANISM FOR CLOCKS.
APPLICATION FILED JAN. 3, 1913.

1,082,077. Patented Dec. 23, 1913.
3 SHEETS—SHEET 1.

Attest:

by

Inventor:
Edward E. Gage
Atty

E. E. GAGE.
ALARM MECHANISM FOR CLOCKS.
APPLICATION FILED JAN. 3, 1913.

1,082,077.

Patented Dec. 23, 1913.

3 SHEETS—SHEET 2.

Attest:

Inventor:
Edward E. Gage by

Atty

E. E. GAGE.
ALARM MECHANISM FOR CLOCKS.
APPLICATION FILED JAN. 3, 1913.
1,082,077.
Patented Dec. 23, 1913.
3 SHEETS—SHEET 3.
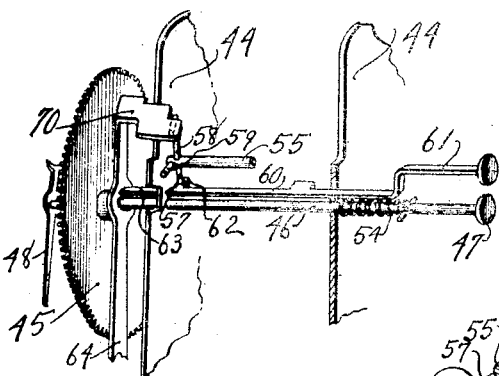
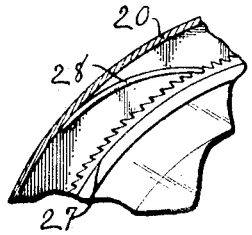
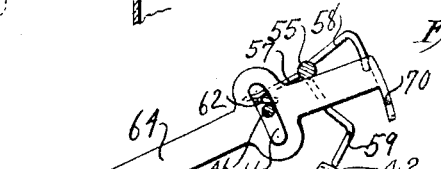
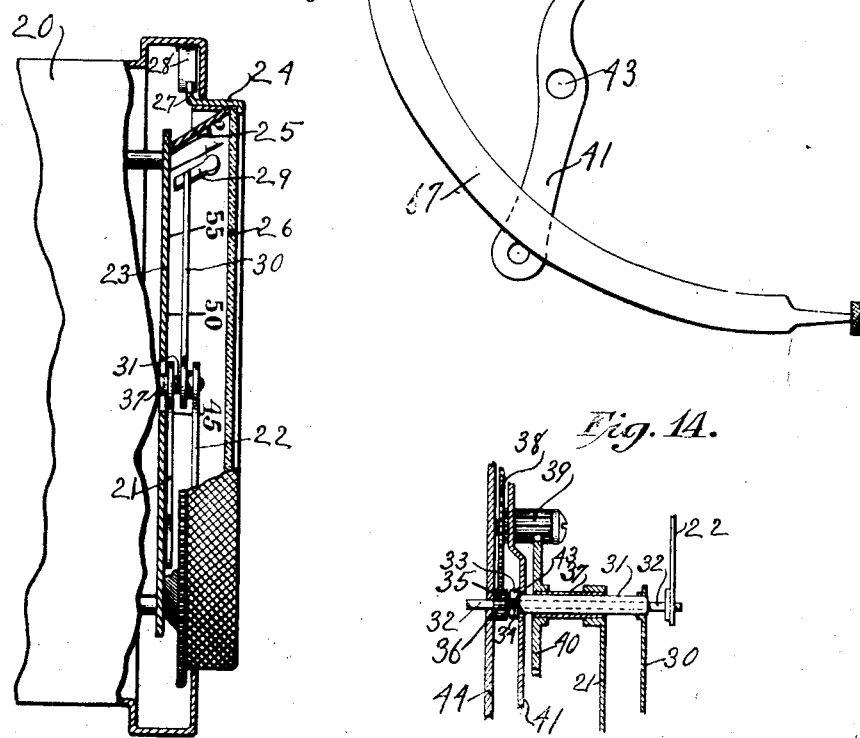
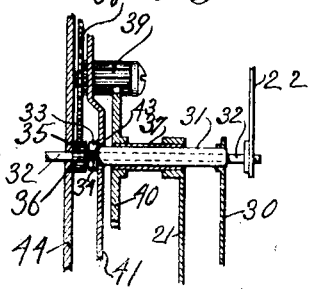
Inventor:
Edward E. Gage

UNITED STATES PATENT OFFICE.

EDWARD E. GAGE, OF NEW YORK, N. Y., ASSIGNOR TO YANKEE WIZARD CLOCK COMPANY, OF NEW YORK, N. Y., A CORPORATION OF NEW JERSEY.

ALARM MECHANISM FOR CLOCKS.

1,082,077.   Specification of Letters Patent.   Patented Dec. 23, 1913.

Application filed January 3, 1913. Serial No. 739,968.

*To all whom it may concern:*

Be it known that I, EDWARD E. GAGE, a citizen of the United States, and a resident of New York, borough of Manhattan, in the county of New York and State of New York, have made and invented certain new and useful Improvements in Alarm Mechanism for Clocks, of which the following is a specification.

My invention relates to alarm clocks; and the object thereof is to provide alarm mechanism which, after the operation thereof has been arrested by means of a manually operable stop or switch as is usual in alarm clocks, will automatically reset itself, so that without further attention the alarm mechanism will operate again after an interval of twenty-four hours; such alarm mechanism being particularly advantageous in clocks designed to operate more than one day after having been wound, such as eight-day clocks, as the only attention necessary is to stop the alarm mechanism thereof after one has arisen, after which the mechanism is automatically reset and will operate again at a corresponding hour the next succeeding day.

A further object of my invention is to provide certain improvements in and relating to alarm clocks of the type patented in Letters Patent No. 878,371, issued to me upon Feb. 4, 1908, and in which means are provided whereby the alarm mechanism of the clock may be set to operate at any particular and predetermined hour and minute, or at the end of a certain number of minutes or hours and minutes after a particular present time; my invention so far as it relates to improvements in and relating to the alarm clocks of the type above referred to being directed to means for more conveniently setting the minute indicating and alarm mechanism so that the alarm will operate at the end of a predetermined time interval; and to means for operatively connecting and disconnecting the minute alarm mechanism with the regular hour alarm mechanism of the clock and for interrupting the entire alarm mechanism so that no alarm will be sounded, said last mentioned means forming a combined controlling member and shut off switch for the alarm mechanism of the clock.

A further object of my invention is to provide a movable bell which may be moved into a position such that the hammer operated by the alarm mechanism may or may not strike the same, so that a loud alarm will be sounded when the hammer strikes the bell or a mere buzzing sound if the hammer does not come into contact with the bell.

A further object of my invention is to greatly simplify alarm clocks of the type to which my invention relates, and to provide an alarm clock designed to operate more than one day at a single winding with stopping and automatic resetting means for the alarm mechanism comprising a single member, whereby an exceedingly simple alarm clock is provided and one not likely to get out of order in use.

With the above and such other objects of invention in view as will be hereinafter referred to, my invention consists in the improved alarm mechanism illustrated in the accompanying drawings and hereinafter described and claimed, and in such variations and modifications thereof as will be obvious to those skilled in the art to which my invention relates.

Figure 2:
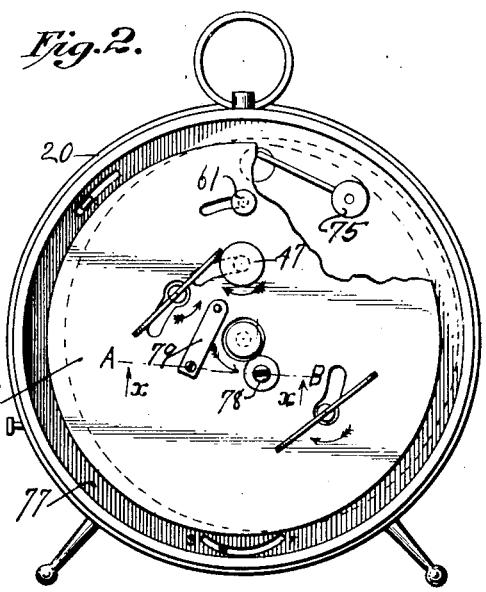
Figure 3:
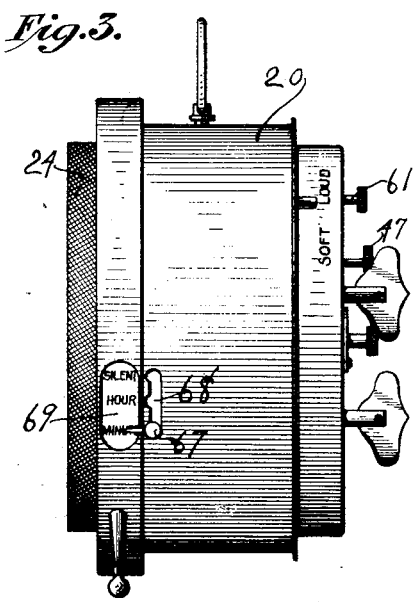
Figure 4:
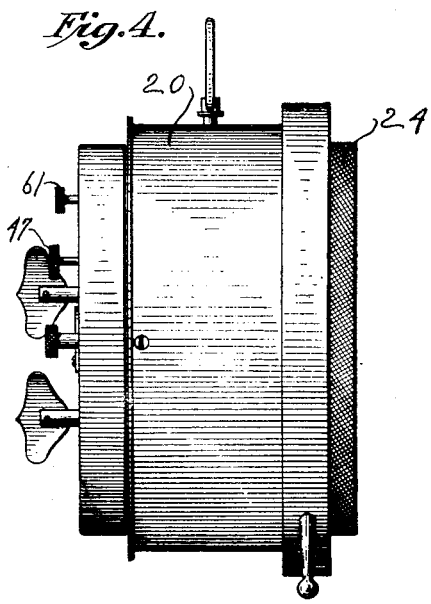
Figure 17:
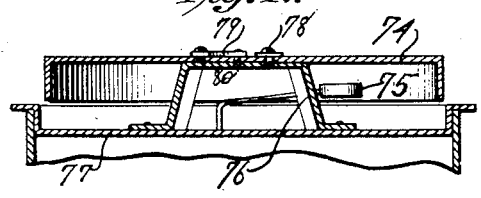
Figure 5:
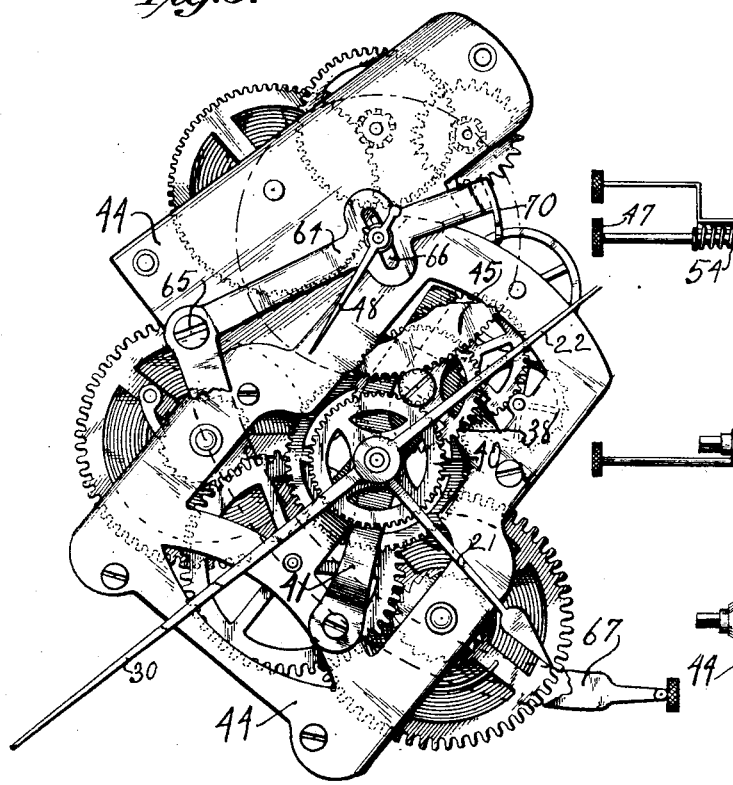
Figure 6:
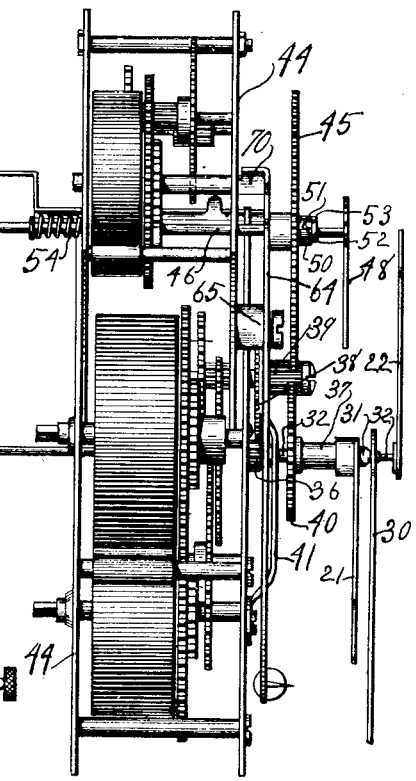
Figure 9:
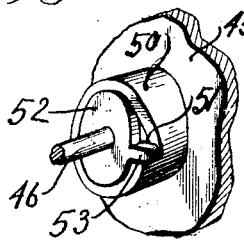
Figure 7:
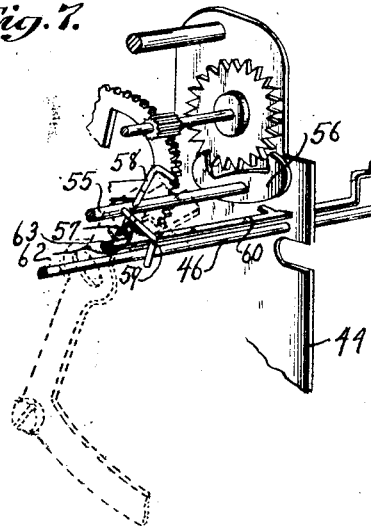
Figure 11:
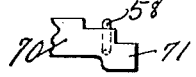
Figure 12:
Figure 13:

In the drawings accompanying and forming a part of this application: Figure 1 is a view showing my improved alarm clock in front elevation; Fig. 2 is a view showing the back thereof; Figs. 3 and 4 are views showing my improved alarm clock as seen from each side thereof; Fig. 5 is a view showing the time and alarm trains of my improved alarm clock; Fig. 6 is a view showing the same in side elevation; Fig. 7 is a fragmentary view showing a portion of the alarm train, and illustrating the mechanism for arresting the operation thereof; Fig. 8 is a similar view illustrating certain stop and switch mechanism for controlling the operation of the alarm mechanism of the clock; Fig. 9 is an enlarged view illustrating a detail of the alarm mechanism; Fig. 10 is a view illustrating certain elements of the alarm mechanism apart from the time and alarm trains; Figs. 11, 12 and 13 are views showing the free ends of two of the elements shown in Fig. 10; Fig. 14 is a view showing the dial train of my improved alarm clock and the mechanism coöperating therewith to permit the clock to be set to operate after a certain number of minutes has elapsed; Fig. 15 is a view showing my improved minute setting mechanism; Fig. 16 is a view showing a detail of the mechanism shown in Fig. 15 as seen from a different position; and Fig. 17 is a fragmentary view showing a section upon a plane indicated by the line A—B, Fig. 2.

Referring to the drawings, the reference character 20 designates the exterior case of my improved alarm clock, 21 the hour hand and 22 the minute hand thereof. Surrounding the dial 23 of the clock is a minute setting ring shown as comprising an outer annular sleeve 24 and an inner inclined portion 25, although the setting ring may be made as a single integral structure if desired. The said setting ring is rotatable in the front portion of the case, and the rear end of the inclined portion 25 thereof moves in contact with the dial. The ring serves as a support for and carries the glass 26, all as best shown in Figs. 1 and 15 of the drawings. The inclined portion 25 of the setting ring is sub-divided and graduated in minutes, as shown in Fig. 1, so that the ring may be turned in a direction opposite to that in which the hands move to bring any selected minute graduation opposite the end of the minute hand. The alarm mechanism of the clock will then be released and will operate after the number of minutes indicated by the graduation selected has elapsed, for example, referring to Fig. 1, the alarm mechanism is set to operate twenty-five minutes after the time indicated by the hands of the clock. The setting ring is shown as provided with a projecting flange 27 the periphery of which is provided with teeth, and a pawl 28 engages these teeth as shown in Fig. 16, to prevent the setting ring from being turned backward.

The inclined portion of the minute setting ring is provided with a slot 29 into which the end of an arm or pointer 30 enters, from which it will be understood that the arm is moved with the setting ring. The inner end of the arm in question is operatively connected with a minute setting sleeve 31 surrounding and movable in the direction of its length upon the arbor or shaft 32 which carries the minute hand 22, see Fig. 14, which sleeve is provided with a collar 33 provided with a depression or notch 34 into which a projection 35 carried by a pinion 36 secured to the minute arbor 32 may enter, from which it follows that when the parts are in position shown in Fig. 14, the setting sleeve will occupy its rearmost position, while if the sleeve is rotated by means of the setting ring and arm 30, it will be pushed forward and away from the pinion 36 as the inclined wall of the notch 34 is moved past the projection 35. The notch 34 and projection 35 above referred to are common features in alarm mechanisms, and are similar in form and operation to the construction shown enlarged and somewhat more clearly in Fig. 9.

Surrounding the sleeve 31 is a sleeve 37 which carries the hour hand of the clock, motion being transmitted to this sleeve from the minute hand arbor 32 through a dial train comprising the pinion 36 above referred to, a gear 38 meshing therewith and which gear is connected with a pinion 39 which pinion in turn meshes with a gear 40 upon the sleeve 37, the ratio of reduction being 12 to 1 as will be understood.

The reference character 41 designates a spring stop member the lower end of which is secured to the frame 44 of the clock trains, see Figs. 5 and 6, and the upper end 42 of which is bent at right angles and extends inward and serves as a stop to prevent the alarm mechanism from operating until it is released by the time train of the clock as will hereinafter appear. This spring stop member is provided with a hole 43 intermediate its ends through which the minute setting sleeve 31 extends when the parts are properly assembled, see Fig. 14, and the tendency of which spring is to force the sleeve inward, because of its engagement with the enlarged collar 33 thereof, to thereby permit the upper end of the spring stop member to move inward and release the alarm mechanism when the projection 35 drops into the notch or depression 34.

Referring now to Figs. 5 to 8, these figures show the time and alarm trains as comprising suitable gears, pinions, and shafts supported in proper relation with one another by means of the frame 44, which trains need not be described in detail, as the same may be of common or any suitable construction and form no part of my invention. It may be mentioned, however, that the time train shown is of the type in which two driving springs are employed. The reference numeral 45 designates a twenty-four hour gear driven from the pinion 39 of the dial train above referred to, the gear being of such a size that it makes one complete rotation each day of twenty-four hours. This gear rotates upon and is movable longitudinally along an hour alarm setting shaft 46, the rear end of which is provided with an operating knob or key 47, and the forward end of which is provided with a pointer 48 movable over an hour dial 49 graduated from 1 to 12 a. m. and from 1 to 12 p. m., so that the alarm mechanism may be set to operate at any hour of the day or night. The hub 50 of the gear 45 is provided with a recess or depression 51 having an abrupt and an inclined wall, and the shaft 46 carries a collar 52 having a projection or lug 53 adapted to move into the recess 51 when the alarm is to operate, all as will be understood and as is common in alarm releasing mechanisms employed in aarm clocks, and which projection and recess form no part of my invention. A spring 54 surrounds the setting shaft 46 and serves to move the same rearward and the projection or lug 53 into the recess 51 when the abrupt wall of the recess passes the lug, as will be understood.

The alarm train of the clock in the embodiment of my invention illustrated operates an oscillating shaft 55 through an escapement 56 as is common in alarm clocks; although it will be obvious from the following description of my invention that the same is applicable also to alarm mechanisms in which a rotary shaft driven through a gear from the alarm train is employed, which rotary shaft operates a rotating, as distinguished from an oscillating hammer for striking the bell. The shaft in question is prolonged and provided at its free end with a striker or hammer for striking a bell located without the clock case as will be understood, and as will be referred to more fully in describing the features of my invention relating to the bell. The shaft in question is provided with arms 57, 58 and 59 through which the alarm mechanism of the clock is controlled, and the reference numeral 60 designates a manually operable stop member shown as slidable in bearings in the frame 44 and as having a portion 61 extending to the outside of the clock case whereby the same may be operated. The stop member 60 acts as a stop for arresting the operation of the alarm train; to which end it is provided with a projection 62 which may be moved into a position such that it will be engaged by the arm 57 above referred to, as shown in Fig. 8, whereupon the operation of the alarm mechanism will be arrested.

Fig. 8 illustrates the parts above referred to in the position they assume after the projection 53 has entered into the recess 51, thus releasing the alarm mechanism, and after the manually operable stop member 60 has been operated to move the projection 62 into the path of the arm 57 to thereby arrest the operation of the alarm mechanism.

It will be appreciated that the operations contemplated in the preceding paragraph are similar to those performed in using an ordinary alarm clock. My invention contemplates, however, a scheme whereby the stopping member above referred to is automatically moved out of engagement with the alarm mechanism, so as to leave the same in condition to operate the next time the projection 53 moves into the recess 51, as the clock continues to operate, so that the only attention necessary to be given to the alarm mechanism is to stop the alarm after it has began to operate. The automatic operation of the stop member 60 is accomplished, in the embodiment of my invention illustrated in the drawings, by extending the inner end of said member, as shown at 63, Fig. 8, into a position such that motion of the gear 45 along the shaft 46 as the inclined wall of the recess 51 moves past and with reference to the projection 53, will be transmitted to the stop member 60 through the extension 63 thereof; whereby as the gear 45 is rotated from the time train, the shaft 46 remaining stationary as will be understood, the stop member is presently moved toward the right, Fig. 8, until the projection 62 thereof is moved out of the path of the arm 57 and into the position shown in Fig. 7. The parts are then in a position such that the alarm mechanism will again operate when the gear 45 has been rotated to such an extent as to permit the projection 53 to again enter the recess 51, that is twenty-four hours after its first operation above referred to. The arm 59 above referred to is extended and bent into such shape that its free end engages the inwardly extending upper end 42 of the spring stop member 41, as best shown in Figs. 10 and 13 and the end of the stop member is provided with a recess 63 which will obviously permit the arm 59 to fall when the stop member moves inward as above explained and the recess thus brought beneath the free end of said arm. From the above it will be obvious that if the projection 53 moves into the recess 51 before the projection 35, Fig. 14 moves into the recess 34, the alarm mechanism will not operate, the operation thereof being deferred until the projection 35 enters the said recess 34. This permits an exact setting of the alarm both as to hours and minutes, which could not be accomplished by the hour dial 49 alone, for, if the pointer 48 is set on the dial 49 to any given hour prior to that at which the alarm is to operate, and if the minute setting ring is set with any selected number on its scale opposite twelve on the clock dial, then the alarm mechanism will operate at the time indicated on the minute setting ring after the hour set on the hour dial 49. With the minute setting ring in the position shown in Fig. 1 the arm 59 will be released at thirty-three minutes past each hour. If then the pointer 48 be set at five upon the hour dial 49, the projection 53 will move into the recess 51 at about five o'clock, but the alarm mechanism will not operate until thirty-three minutes later when the end 42 of the spring arm 41 moves inward and releases the arm 59.

My invention contemplates a single movable combined controlling member and switch which performs the three functions of preventing the alarm mechanism from operating until the time arrives for which it is set, shutting the alarm mechanism off entirely so that it will remain silent and not operate until said controlling member or element is again moved to release the alarm mechanism, and putting the parts in such a condition that the alarm mechanism may be used in connection with the minute setting ring alone in which case it will operate at the end of any number of minutes less than one hour in advance of the time indicated by the hands of the clock. This controlling member or switch is shown as comprising an oscillating arm 64 made preferably of resilient material and pivotally supported from the frame 44 at 65, so that the upper end thereof may move inward and outward, and so that the arm as a whole may be moved in the plane of the frame 44 to vary the position of the upper end thereof, both said movements being about the pivot 65 as a center. The upper end of this arm is provided with a slot 66 through which the hour setting shaft 46 extends, from which construction it will be understood that the hub 50 of the gear 45 presses against this spring arm and forces its upper end inward, or to the right, Fig. 8, as said gear moves along said shaft. The controlling element in question is shown as provided with an operating arm 67 extending through a slot 68 Fig. 3, provided in the clock case, and as having a pointer moving over a plate 69 suitably inscribed to indicate the effect of the controlling member upon the alarm mechanism when in either one of the three positions indicated upon the plate. The upper or free end of the spring arm 64 is bent inward at substantially a right angle to provide a stop 70 with which the arm 58 of the shaft 55 engages and whereby the alarm mechanism is prevented from operating until the time arrives at which it is set to operate, all as best shown in Figs. 8, 10, 11 and 12. The arm 64 swings outward when the abrupt wall of the recess 51 passes the projection 53, and, as the said projection moves into the recess 51 the stop 70 at the upper end thereof moves outward, or to the left, Figs. 10 and 12, thus releasing the arm 58 and permitting the alarm mechanism to operate.

The stop 70 is of substantially the form best shown in Figs. 11 and 12 of the drawing and has a narrow portion 71 which may be placed in permanent engagement with the arm 58 to thereby shut off the alarm mechanism. Thus, referring to Figs. 3, 8, 10 and 11, if the arm 67 is placed in the "silent" position, the stop 70 is moved into such a position that the narrow portion 71 thereof is in permanent engagement with the arm 58 notwithstanding the inward and outward movements of the stop caused by the projection 53 moving into and out of the recess 51, and the alarm mechanism is prevented from operating. If the arm 67 is placed in the "hour" position, then the stop 70 is moved into such a position that a wider portion 72 thereof is in engagement with the arm 58 as shown in Fig. 12, but this wider portion 72 is shorter than the portion 71 so that as the stop 70 moves to the left as hereinbefore explained, the arm 58 is released as the edge 73 moves past the same, thus releasing the alarm mechanism and permitting the same to operate. Finally, if the arm 67 is placed in the "minute" position the stop 70 is moved into such a position as to be entirely out of engagement with the arm 58 at all times, in which case the upper end 42 of the spring stop member 41 in connection with the arm 59 serves to prevent the operation of the alarm mechanism, and the clock may be set to operate a certain number of minutes after the time indicated by the hands of the clock, the interval to elapse being determined by the minute setting ring as hereinbefore explained.

Figs. 2 and 17 illustrate the movable bell of my improved alarm mechanism, the same being designated by the reference numeral 74, and 75 designates a hammer operated by the alarm mechanism and designed to strike the bell when the same is in the position shown in full lines in Fig. 2. The bell is supported by means of a bridge or equivalent support 76 carried by the back 77 of the clock case, and is secured in place by means of a screw or rivet 78 about which it may swing. A spring-pressed holding member or catch 79 is secured to the bell and the free end of which extends through a hole therein and into a recess or depression 80 provided in the bridge 76 to thereby hold the bell in one of the two positions in which it may be placed, and a second depression is provided with which the catch engages to hold the bell in its other position. Slots are provided in the bell, as shown in Fig. 2, so that the movement thereof will not be prevented by the shafts of the winding and setting keys, or by the alarm stopping member, all of which extend through the bell in the specific embodiment of my invention illustrated in the drawings. When the bell is in the position shown in full lines, Fig. 2, the hammer 75 will obviously strike the bell and make a loud noise. If, however, the bell be grasped by the hand and moved into the position shown in dotted lines in said figure, then the hammer will not contact with the bell as it operates and a buzzing noise due to the operation of the alarm train will result when the alarm mechanism is released.

Having thus described and explained my invention, I claim and desire to secure by Letters Patent:

1. In an alarm clock, a time train; a shaft carrying a hammer adapted to strike a bell; an arm carried by said shaft; an alarm train operatively connected with said shaft to drive the same; means controlled by said time train for releasing said alarm train at a predetermined time; a suitable frame for supporting said trains; a manually operable reciprocating stop member slidable in bearings provided in said frame and adapted to be moved into the path of movement of said arm to thereby interrupt the operation of said alarm train and to be moved out of engagement therewith by said time train.

2. In an alarm clock, a time train; a shaft carrying a hammer adapted to strike a bell; an arm carried by said shaft; an alarm train operatively connected with said shaft to drive the same; means controlled by said time train for releasing said alarm train at a predetermined time; a suitable frame for supporting said trains; a manually operable reciprocating stop member slidable in bearings provided in said frame and having a projection adapted to be moved into the path of movement of said arm to thereby interrupt the operation of said alarm train and operated by said time train to thereby move the said projection out of engagement with said arm.

3. In an alarm clock, a time train; a shaft carrying a hammer adapted to strike a bell; an arm carried by said shaft; an alarm train operatively connected with said shaft to drive the same; a suitable frame for supporting said trains; a setting shaft having a projection; a gear carried by said shaft and movable longitudinally thereupon, said gear being operated by said time train and having a depression into which said projection may enter; a manually operable reciprocating stop member slidable in bearings provided in said frame and having a projection adapted to be moved into the path of movement of said arm to thereby interrupt the operation of said alarm train and whereby longitudinal movement of said gear is transmitted to said stop member to thereby move the projection thereof out of engagement with said arm.

4. In an alarm clock, a time train; an alarm train; a combined controlling member and switch for releasing said alarm train at a predetermined time to thereby permit it to operate, and for permanently shutting off or arresting the operation of said alarm train, said controlling member being in engagement with an element of the alarm train to thereby prevent the operation thereof and the same being movable in one direction to release said alarm train; means controlled by said time train for controlling the releasing movement of said controlling member; and means for moving said controlling member in another direction with reference to the element of the alarm train with which it engages.

5. In an alarm clock, a time train; an alarm train, a combined controlling member and switch for releasing said alarm train at a predetermined time to thereby permit it to operate, and for permanently shutting off or arresting the operation of said alarm train, said controlling member comprising a pivotally supported oscillating arm the free end of which is adapted to engage an element of the alarm train to thereby prevent the operation thereof, and which free end is movable in one direction to release said alarm train; means controlled by said time train for controlling the releasing movement of said controlling member; and means for moving the free end of said controlling member in another direction with reference to the element of the alarm train with which it engages.

6. In an alarm clock, a time train; a shaft having an arm; an alarm train operatively connected with said shaft to drive the same; a combined controlling member and switch for releasing said alarm train at a predetermined time to thereby permit it to operate, and for permanently shutting off or arresting the operation of said alarm train, said controlling member being in engagement with said arm to thereby prevent the operation of said alarm train and the same being movable in one direction to release said arm; a setting shaft having a projection; a gear carried by said setting shaft and operated by said time train and having a depression into which said projection may enter, and which gear is adapted to control the movement of said controlling member to release said arm; and means for moving said controlling member with reference to said arm in a direction other than that in which it is permitted to move by said gear.

7. In an alarm clock, a time train; a shaft having an arm; an alarm train operatively connected with said shaft to drive the same; a combined controlling member and switch for releasing said alarm train at a predetermined time to thereby permit it to operate, and for permanently shutting off or arresting the operation of said alarm train, said controlling member comprising a pivotally supported oscillating arm the free end of which is adapted to engage the arm aforesaid upon said shaft to thereby prevent the operation of said alarm train and which free end is movable in one direction to release said arm; a setting shaft having a projection; a gear carried by said setting shaft and operated by said time train and having a depression into which said projection may enter, said gear being movable longitudinally of said setting shaft and the same being adapted to control the movement of said controlling member to release said first-mentioned arm; and means for moving the free end of said controlling member with reference to said arm in a direction other than that in which it is permitted to move by said gear.

8. In an alarm clock, a time train; a shaft having an arm; an alarm train operatively connected with said shaft to drive the same;

a combined controlling member and switch for releasing said alarm train at a predetermined time to thereby permit it to operate, and for permanently shutting off or arresting the operation of said alarm train, said controlling member being in engagement with said arm to thereby prevent the operation of said alarm train and the same being movable in one direction to release said alarm train at a certain predetermined time; means controlled by the time train for controlling the releasing movement of said controlling member; means for moving said controlling member in another direction with reference to said arm; and means other than said controlling member and controlled by said time train for releasing said alarm train.

9. In an alarm clock, a time train; a shaft having an arm; an alarm train operatively connected with said shaft to drive the same; a combined controlling member and switch for releasing said alarm train at a predetermined time to thereby permit it to operate, and for permanently shutting off or arresting the operation of said alarm train, said controlling member comprising a pivotally supported oscillating arm the free end of which is adapted to engage the arm aforesaid of said shaft to thereby prevent the operation of said alarm train, and which free end is movable in one direction to release the arm of said shaft at a certain predetermined time; means controlled by the time train for controlling the releasing movement of said controlling member; means for moving the free end of said oscillating arm in another direction with reference to the arm of said shaft; and means other than said controlling member and controlled by said time train for releasing said alarm train.

10. In an alarm clock, an alarm train; a time train including a centrally located shaft adapted to carry a hand of the clock; a case within which said trains are located; means controlled by said time train for releasing said alarm train to permit the same to operate; a rotary setting member carried by said shaft for determining the time at which said alarm train shall be released; an arm operatively connected with said setting member; and a rotatable graduated setting ring surrounding the face of the clock and carrying a glass, and with which setting ring the outer end of said arm engages.

11. In an alarm clock the combination with a casing, of alarm mechanism contained within said casing and comprising in part a hammer, a bell pivotally supported to the rear of said casing, and provided with an inwardly turned flange, and within which bell is located said hammer, whereby said flange of the bell may be moved toward or away from said hammer.

12. In an alarm clock, the combination with a casing, of alarm mechanism contained within said casing and comprising in part a hammer, a bell supported in the rear of said clock casing and provided with an inwardly extending peripheral flange, and within which bell is located said hammer, and means connected with said bell and said clock casing whereby the former may be turned eccentrically to said casing and thereby move said inwardly turned flange toward or away from said hammer.

Signed at New York, borough of Manhattan, in the county of New York, and State of New York, this 2nd day of January A. D. 1913.

EDWARD E. GAGE.

Witnesses:
MARY B. JUSTICE,
ANNA V. WALSH.